United States Patent
Krishnan et al.

(10) Patent No.: US 11,856,225 B2
(45) Date of Patent: Dec. 26, 2023

(54) METHODS FOR EFFICIENT APPLICATION OF LGT

(71) Applicant: TENCENT AMERICA LLC, Palo Alto, CA (US)

(72) Inventors: Madhu Peringassery Krishnan, Mountain View, CA (US); Xin Zhao, San Diego, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/976,251

(22) Filed: Oct. 28, 2022

(65) Prior Publication Data

US 2023/0074661 A1    Mar. 9, 2023

Related U.S. Application Data

(63) Continuation of application No. 16/938,335, filed on Jul. 24, 2020, now Pat. No. 11,575,937.

(51) Int. Cl.
*H04N 19/61* (2014.01)
*H04N 19/159* (2014.01)
(Continued)

(52) U.S. Cl.
CPC .......... *H04N 19/61* (2014.11); *H04N 19/122* (2014.11); *H04N 19/159* (2014.11); *H04N 19/176* (2014.11)

(58) Field of Classification Search
CPC .... H04N 19/61; H04N 19/122; H04N 19/159; H04N 19/176
(Continued)

(56) References Cited

U.S. PATENT DOCUMENTS 8,238,442 B2    8/2012    Liu
8,526,495 B2    9/2013    Liu et al.
(Continued)

FOREIGN PATENT DOCUMENTS

WO    2018/013935 A1    1/2018

OTHER PUBLICATIONS

B. Bross et al., "General Video Coding Technology in Responses to the Joint Call for Proposals on Video Compression with Capability beyond HEVC," in IEEE Transactions on Circuits and Systems for Video Technology, 2019, pp. 1-16, (16 pages total).
(Continued)

*Primary Examiner* — Nguyen T Truong
(74) *Attorney, Agent, or Firm* — Sughrue Mion, PLLC

(57) ABSTRACT

A method of decoding image data is provided. The method may include generating a dequantized block of an image based on a coded bitstream; determining whether to use one from among an implicit method and an explicit method for selecting a hybrid transform kernel from among one or more hybrid transform kernel that are available for decoding the dequantized block, wherein the one or more hybrid transform kernel are available for decoding the dequantized block based on associations between prediction modes and sizes of blocks; selecting, by using the one from among the implicit method and the explicit method, the hybrid transform kernel from among the one or more hybrid transform kernel; and performing inverse transform coding of the dequantized block based on the selected hybrid transform kernel.

12 Claims, 10 Drawing Sheets

(51) Int. Cl.
  *H04N 19/176* (2014.01)
  *H04N 19/122* (2014.01)
(58) Field of Classification Search
  USPC .................................................. 375/240.13
  See application file for complete search history.

(56) References Cited

U.S. PATENT DOCUMENTS

| | | | |
|---|---|---|---|
| 9,049,452 | B2 | 6/2015 | Liu et al. |
| 9,788,019 | B2 | 10/2017 | Liu et al. |
| 10,432,929 | B2 | 10/2019 | Zhao et al. |
| 10,462,486 | B1 | 10/2019 | Zhao et al. |
| 10,536,720 | B2 | 1/2020 | Zhao et al. |
| 10,567,801 | B2 | 2/2020 | Zhao et al. |
| 10,609,384 | B2 | 3/2020 | Chen et al. |
| 10,609,402 | B2 | 3/2020 | Zhao et al. |
| 2018/0020218 | A1 | 1/2018 | Zhao et al. |
| 2018/0213233 | A1* | 7/2018 | Koo .................. H04N 19/147 |
| 2018/0367796 | A1 | 12/2018 | Hendry et al. |
| 2019/0342579 | A1 | 11/2019 | Zhao et al. |
| 2020/0099924 | A1 | 3/2020 | Seregin et al. |
| 2020/0128271 | A1 | 4/2020 | Tanner |

OTHER PUBLICATIONS

B. Bross et al., "CE3: Multiple reference line intra prediction (Test 1.1.1, 1.1.2, 1.1.3 and 1.1.4)" Joint Video Experts Team (JVET) of ITU-T SG 16 WP 3 and ISO/IEC JTC 1/SC 29/WG 11, JVET-L0283 v2, 12th Meeting: Macao, CN, Oct. 3-12, 2018 (7 pages total).
B. Bross et al., "Versatile video coding (draft 2)", Joint Video Experts Team (JVET) of ITU-T SG 16 WP 3 and ISO/IEC JTC1/SC 29/WG11, JVET-K1001 v6, Jul. 2018 (141 pages total).
F. Racape et al., "CE3-related: Wide-angle intra prediction for non-square blocks," Joint Video Experts Team (JVET) of ITU-T SG 16 WP 3 and ISO/IEC JTC 1/SC 29/WG 11, JVET-K0500 r2, 11th Meeting: Ljubljana, SI, Jul. 10-18, 2018 (7 pages total).
H. E. Egilmez et al., "Graph-based transforms for video coding," CoRR, vol. abs/arXiv:1909.00952, 2019, pp. 1-12 https://arxiv.org/abs/1909.00952 (12 pages total).
International Search Report dated Sep. 15, 2021, in International Application No. PCT/US21/31945.
L. Zhao et al., "Wide Angular Intra Prediction for Versatile Video Coding," 2019 Data Compression Conference (DCC), Snowbird, UT, USA, 2019, pp. 53-62 (10 pages total).
P. de Rivaz, et al., "AV1 Bitstream & Decoding Process Specification", Version 1.0.0 with Errata 1, Jan. 8, 2019 (681 pages total).
S. Liu et al., "Joint temporal-spatial bit allocation for video coding with dependency," in IEEE Transactions on Circuits and Systems for Video Technology, vol. 15, No. 1, pp. 15-26, Jan. 2005 (12 pages total).
Written Opinion of the International Searching Authority dated Sep. 15, 2021, in International Application No. PCT/US21/31945.
X. Zhao et al., "Coupled Primary and Secondary Transform for Next Generation Video Coding," 2018 IEEE Visual Communications and Image Processing (VCIP), Taichung, Taiwan, 2018, pp. 1-4 (4 pages total).
X. Zhao et al., "Low-Complexity Intra Prediction Refinements for Video Coding," 2018 Picture Coding Symposium (PCS), San Francisco, CA, 2018, pp. 139-143 (5 pages total).
X. Zhao et al., "CE6: Fast DST-7/DCT-8 with dual implementation support (Test 6.2.3)," Joint Video Experts Team (JVET) of ITU-T SG 16 WP 3 and ISO/IEC JTC 1/SC 29/WG 11, JVET-M0497, 13th Meeting: Marrakech, MA, Jan. 9-18, 2019 (11 pages total).
X. Zhao et al., "CE6: On 8-bit primary transform core (Test 6.1.3)," Joint Video Experts Team (JVET) of ITU-T SG 16 WP 3 and ISO/IEC JTC 1/SC 29/WG 11, JVET-L0285-r1, 12th Meeting: Macao, CN, Oct. 3-12, 2018 (18 pages total).
X. Zhao et al., "CE6-related: Unified LFNST using block size independent kernel" Joint Video Experts Team (JVET) of ITU-T SG 16 WP 3 and ISO/IEC JTC 1/SC 29/WG 11, JVET-0539-v2, 15th Meeting: Gothenburg, SE, Jul. 3-12, 2019 (19 pages total).
X. Zhao et al., "Joint separable and non-separable transforms for next-generation video coding," IEEE Transactions on Image Processing, vol. 27, No. 5, pp. 2514-2525, May 2018 (13 pages total).
X. Zhao et al., "Non-CE6: Configurable maximum transform size in VVC" Joint Video Experts Team (JVET) of ITU-T SG 16 WP 3 and ISO/IEC JTC 1/SC 29/WG 11, JVET-0545-v2, 15th Meeting: Gothenburg, SE, Jul. 3-12, 2019 (6 pages total).
X. Zhao et al., "Novel Statistical Modeling, Analysis and Implementation of Rate-Distortion Estimation for H.264/AVC Coders," in IEEE Transactions on Circuits and Systems for Video Technology, vol. 20, No. 5, pp. 647-660, May 2010 (14 pages total).
Y. J. Chang et al., "Intra prediction using multiple reference lines for the versatile video coding standard," Proc. SPIE 11137, Applications of Digital Image Processing XLII, 1113716, Sep. 2019 (8 pages total).
Z. Zhang et al., "Fast Adaptive Multiple Transform for Versatile Video Coding," 2019 Data Compression Conference (DCC), Snowbird, UT, USA, 2019, pp. 63-72 (10 pages total).
Z. Zhang et al., "Fast DST-7/DCT-8 with Dual Implementation Support for Versatile Video Coding," in IEEE Transactions on Circuits and Systems for Video Technology, 2020, pp. 1-17 (17 pages total).
Extended European Search Report dated Oct. 4, 2023 in Application No. 21847425.2.

* cited by examiner

FIG. 2 Streaming System 200

Table 1: AV1 primary transform basis functions (DCT-2, DST-4 and DST-7 for N-point input).

| Transform Type | Basis function $T_i(j)$, $i,j=0, 1, \ldots, N-1$ |
|---|---|
| DCT-2 | $T_i(j) = \omega_0 \cdot \sqrt{\dfrac{2}{N}} \cdot \cos\left(\dfrac{\pi \cdot i \cdot (2j+1)}{2N}\right)$<br>where $\omega_0 = \begin{cases} \sqrt{\dfrac{2}{N}} & i = 0 \\ 1 & i \neq 0 \end{cases}$ |
| DST-4 | $T_i(j) = \sqrt{\dfrac{2}{N}} \cdot \sin\left(\dfrac{\pi \cdot (2i+1) \cdot (2j+1)}{4N}\right)$ |
| DST-7 | $T_i(j) = \sqrt{\dfrac{4}{2N+1}} \cdot \sin\left(\dfrac{\pi \cdot (2i+1) \cdot (j+1)}{2N+1}\right)$ |

FIG. 5A

| Transform Types | Description | Prediction mode | |
|---|---|---|---|
| | | Intra | Inter |
| DCT_DCT | DCT ↓ and → | ✓ (all block sizes) | ✓ (all block sizes) |
| ADST_DCT | ADST ↓, DCT → | ✓ (Block size ≤ 16×16) | ✓ (Block size ≤ 16×16) |
| DCT_ADST | DCT ↓, ADST → | | |
| ADST_ADST | ADST ↓ and → | | |
| FLIPADST_DCT | FLIPADST ↓, DCT → | × | ✓ (Block size ≤ 16×16) |
| DCT_FLIPADST | DCT ↓, FLIPADST → | | |
| FLIPADST_FLIPADST | FLIPADST ↓ and → | | |
| ADST_FLIPADST | ADST ↓, FLIPADST → | | |
| FLIPADST_ADST | FLIPADST ↓, ADST → | | |
| IDTX | IDTX ↓ and → | ✓ (Block size ≤ 16×16) | ✓ (Block size ≤ 32×32) |
| V_DCT | DCT ↓, IDTX → | ✓ (Block size ≤ 16×16) | ✓ (Block size ≤ 16×16) |
| H_DCT | IDTX ↓, DCT → | | |
| V_ADST | ADST ↓, IDTX → | × | ✓ (Block size ≤ 16×16) |
| H_ADST | IDTX ↓, ADST → | | |
| V_FLIPADST | FLIPADST ↓, IDTX → | × | ✓ (Block size ≤ 16×16) |
| H_FLIPADST | IDTX ↓, FLIPADST → | | |

Table 2: AV1 hybrid transform kernels and their availability based on prediction modes and block sizes.

FIG. 5B

Generic LGT characterized by self-loop weights $v_{e1}$, $v_{e2}$ and edge weights $w_e$

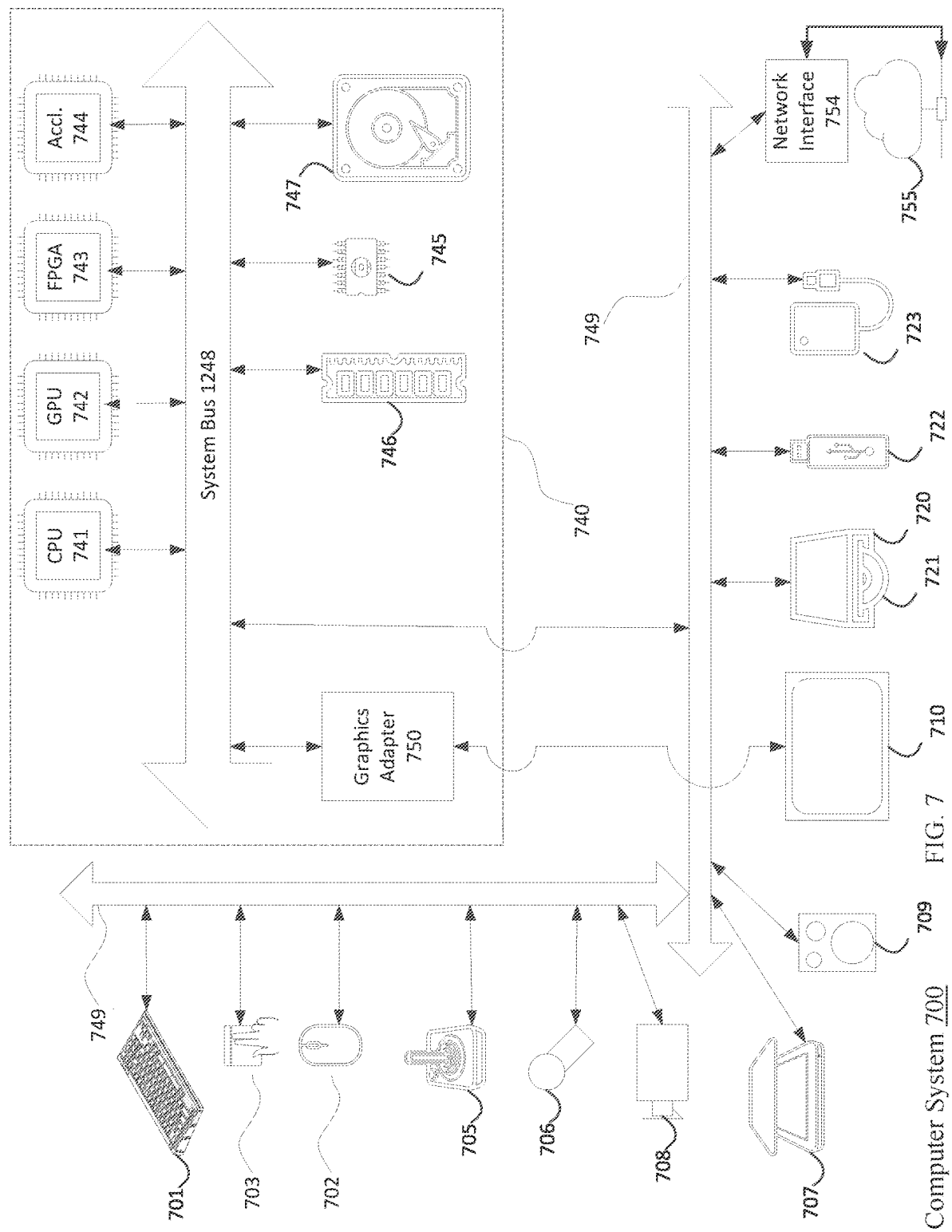

METHODS FOR EFFICIENT APPLICATION OF LGT

CROSS-REFERENCE TO THE RELATED APPLICATION

This application is a continuation of U.S. application Ser. No. 16/938,335, filed on Jul. 24, 2020, the disclosure of which is incorporated herein by reference in its entirety.

BACKGROUND

Field

This disclosure is related to video compression technologies and inter-prediction and intra-prediction in advanced video codec. In particular, the disclosure is related to next-generation video coding technologies including video coding/decoding technologies beyond High Efficiency Video Coding (HEVC), such as Versatile Video Coding (VVC), AOMedia Video 1 (AV1) and its successors. More specifically, an aspect of the disclosure is directed to a method, an apparatus and computer-readable medium that provide a set of advanced video coding technologies designed for efficient compression of video data. The proposed technologies involve methods for efficient application of Line graph transforms (LGT).

Description of Related Art

Video coding and decoding using inter-picture or intra-picture prediction with motion compensation has been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 hertz (Hz). Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video may require more than 600 GByte of storage space.

One purpose of video coding and decoding can be the reduction of redundancy in the input video signal, through compression. Compression can help reduce aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A person of ordinary skill generally understands video compression/decompression technology. In general, to compress video or image data, a series of functional steps are performed to result in a compressed video or image file. Although an image, such as a 360° image (e.g., captured by a 360° camera) may be suitable for compression, for ease of reading, compression of a video file will be explained. To generate a compressed video file, under conventional standards (e.g., H.264, H.265) an uncompressed video sample stream that is received from a video source may be partitioned or parsed, which results in a block of samples of two or more reference pictures.

Bi-Prediction can relate to techniques where a prediction unit (PU), such as a predicted block of samples, can be predicted from two motion compensated blocks of samples of two or more reference pictures. Bi-prediction was first introduced into video coding standards in MPEG-1, and has also been included in other video coding technologies and standards such as MPEG-2 Part 2 (or H.262), H.264 and H.265 as well.

When decompressing a compressed video file, during the reconstruction of a sample of a bi-predicted PU, motion compensated and interpolated input samples from each reference block can be multiplied by a weighting factor that can be different for each reference block, and such weighted sample values of the two reference blocks can be added to generate the sample under reconstruction. Such sample can be processed further by mechanisms such as loop filtering.

In MPEG-1 and MPEG-2, the weighting factors can be determined based on the relative temporal distance between the picture to which the PU under reconstruction belongs to, and the two reference pictures. This is possible because, in MPEG-1 and MPEG-2, one of the two reference I or P pictures was in the "past", and the other in the "future" (in terms of presentation order) of the B-picture under reconstruction, and because in MPEG-1 and MPEG-2, there was a well-defined timing relationship established for any picture under reconstruction in relation to its reference pictures.

Starting with H.264, the reference picture selection concepts for bi-predicted pictures were relaxed such that the reference pictures only needed to be earlier in decoding order, but not in presentation order. Further, the notion of time was also relaxed in that neither H.264 nor H.265 requires a constrained/fixed picture interval in the time domain. Therefore, a decoder cannot calculate weighting factors any more based on the timing information available in the bitstream. Instead, H.264 and H.265 include a "default" of 0.5 as the weighting factor for the reference samples of a bi-predicted picture. This default can be overwritten by syntax available in the slice header known as pred_weight_table( ). The default of 0.5 or the information in the pred_weight_table may apply to all bi-predicted PUs in a given slice.

AOMedia Video 1 (AV1) was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala already published code in 2010, Google's experimental VP9 evolution project VP10 was announced on 12 Sep. 2014, and Cisco's Thor was published on 11 Aug. 2015. Building on the codebase of VP9, AV1 incorporates additional techniques, several of which were developed in these experimental formats. The first version 0.1.0 of the AV1 reference codec was published on 7 Apr. 2016. The Alliance announced the release of the AV1 bitstream specification on 28 Mar. 2018, along with a reference, software-based encoder and decoder. On 25 Jun. 2018, a validated version 1.0.0 of the specification was released. On 8 Jan. 2019 a validated version 1.0.0 with Errata 1 of the specification was released. The AV1 bitstream specification includes a reference video codec.

AOMedia Video 2 (AV2) is currently under development and the proposed transform cores (e.g., 8-bit or 10-bit transform cores) are designed for it.

SUMMARY

According to embodiments of the present disclosure, a method of decoding image data performed by at least one processor is provided. The method includes: receiving a coded bitstream that includes an image; generating a dequantized block of the image based on the coded bitstream; determining whether to use one from among an implicit method and an explicit method for selecting a hybrid transform kernel from among one or more hybrid transform kernel that are available for decoding the dequantized block, wherein the one or more hybrid transform kernel are available for decoding the dequantized block based on associations between prediction modes and sizes of blocks, and each of the one or more hybrid transform kernel includes at least two transform types, which includes at least two transform types that are the same, or at least two transform types that are different; selecting, by using the one from among the implicit method and the explicit method, the hybrid transform kernel from among the one or more hybrid transform kernel that are available for decoding the dequantized block; and performing inverse transform coding of the dequantized block based on the selected hybrid transform kernel.

According to one or more embodiments of the present disclosure, the implicit method is determined to be used, the method further includes identifying the one or more hybrid transform kernel that are available for decoding the dequantized block, and the selecting includes selecting a transform type based on coded information that is available to both an encoder and a decoder.

According to one or more embodiments of the present disclosure, the implicit method includes: when a block size (M×N) is greater than a block size threshold, a first hybrid transform kernel is used, and when the block size (M×N) is less than the block size threshold, a second hybrid transform kernel is used, wherein the first hybrid transform kernel and the second hybrid transform kernel have at least one difference.

According to one or more embodiments of the present disclosure, the implicit method includes identifying available elements of the one or more hybrid transform kernel based on a shape of the dequantized block.

According to one or more embodiments of the present disclosure, the implicit method includes identifying available elements of the one or more hybrid transform kernel based on the prediction modes including different intra prediction and inter prediction modes used to generate the dequantized block.

According to one or more embodiments of the present disclosure, the at least one transform kernel includes one or more combinations of vertical and horizontal transform types.

According to one or more embodiments of the present disclosure, the one or more combinations of vertical and horizontal transform types includes at least one line graph transform (LGT) core that performs direct matrix multiplications for one or more of the horizontal and vertical dimensions of the dequantized block.

According to one or more embodiments of the present disclosure, the one or more combinations of vertical and horizontal transform types includes at least one of: DCT_DCT, LGT_LGT, DCT_LGT, or LGT_DCT, wherein LGT is a line graph transform (LGT) core.

According to one or more embodiments of the present disclosure, the performing of the inverse transform coding of the dequantized block using the selected hybrid transform kernel includes performing, in no particular order: inverse transform coding of a vertical dimension using a vertical transform type of the selected hybrid transform kernel; and inverse transform coding of a horizontal dimension using a horizontal transform type of the selected hybrid transform kernel.

According to one or more embodiments of the present disclosure, the hybrid transform kernels are AOMedia Video 2 (AV2) hybrid transform kernels.

According to one or more embodiments of the present disclosure, the explicit method is determined to be used, the method further includes obtaining a first flag and a second flag from the coded bitstream that identify the hybrid transform kernel, as a part of the explicit method, and the first flag indicates availability of the one or more hybrid transform kernel for decoding, and the second flag indicates the hybrid transform kernel from among the one or more hybrid transform kernel used for decoding.

According to one or more embodiments of the present disclosure, the method further includes indicating a switch from the implicit method to the explicit method, wherein the explicit method includes a transform type being identified by a syntax or flag signaled in the coded bitstream.

According to one or more embodiments of the present disclosure, different hybrid transform kernels are used between the implicit method and the explicit method.

According to one or more embodiments of the present disclosure, the syntax or flag is indicated at a subblock-level including one or more of: superblock level, coding block level, prediction block level or transform block level.

According to one or more embodiments of the present disclosure, the hybrid transform kernel that is selected includes a line graph transform (LGT), and the method further includes signaling, as a part of the explicit method, an indicator of a self-loop weight value of the LGT.

According to embodiments of the present disclosure, an apparatus is provided. The apparatus includes: at least one memory configured to store computer program code; and at least one processor configured to access the at least one memory and operate according to the computer program code. The computer program code includes: dequantized block generation code configured to cause the at least one processor to perform control so that a dequantized block of an image, received in a coded bitstream, is generated; determining code configured to cause the at least one processor to determine whether to use one from among an implicit method and an explicit method for selecting a hybrid transform kernel from among one or more hybrid transform kernel that are available for decoding the dequantized block, wherein the one or more hybrid transform kernel are available for decoding the dequantized block based on associations between prediction modes and sizes of blocks, and each of the one or more hybrid transform kernel includes at least two transform types, which includes at least two transform types that are the same, or at least two transform types that are different; selecting code configured to cause the at least one processor to select, by using the one from among the implicit method and the explicit method, the hybrid transform kernel from among the one or more hybrid transform kernel that are available for decoding the dequantized block; and transform coding code configured to cause the at least one processor to perform inverse transform coding of the dequantized block based on the selected hybrid transform kernel.

According to embodiments of the present disclosure, a non-transitory computer-readable medium storing computer code is provided. The computer code is configured to, when executed by at least one processor, cause the at least one processor to implement an decoder that: receives a coded bitstream that includes an image; generates a dequantized block of the image based on the coded bitstream; determines whether to use one from among an implicit method and an explicit method for selecting a hybrid transform kernel from among one or more hybrid transform kernel that are available for decoding the dequantized block, wherein the one or more hybrid transform kernel are available for decoding the dequantized block based on associations between prediction modes and sizes of blocks, and each of the one or more hybrid transform kernel includes at least two transform types, which includes at least two transform types that are the same, or at least two transform types that are different; selects, by using the one from among the implicit method and the explicit method, the hybrid transform kernel from among the one or more hybrid transform kernel that are available for decoding the dequantized block; and performs inverse transform coding of the dequantized block based on the selected hybrid transform kernel.

According to one or more embodiments of the present disclosure, the at least one transform kernel includes one or more combinations of vertical and horizontal transform types.

According to one or more embodiments of the present disclosure, the computer code is further configured to, when executed by the at least one processor, cause the at least one processor to signal a first flag and a second flag that identifies the hybrid transform kernel, as a part of the explicit method, and the first flag indicates availability of the one or more hybrid transform kernel for coding, and the second flag indicates the hybrid transform kernel, that includes a combination of a vertical and a horizontal transform type, from among the one or more hybrid transform kernel.

According to one or more embodiments of the present disclosure, hybrid transform kernel that is selected includes a line graph transform (LGT), and the computer code is further configured to, when executed by the at least one processor, cause the at least one processor to, as a part of the explicit method, signal an indicator of a self-loop weight value of the LGT.

BRIEF DESCRIPTION OF THE DRAWINGS

Further features, the nature, and various advantages of the disclosed subject matter will be more apparent from the following detailed description and the accompanying drawings in which.

Table 2 (FIG. 5B) shows AV1 hybrid transform kernels and their availability based on prediction modes and block sizes.

Figure 5C:
FIG. 5A shows a Table 1 showing AV1 primary transform basis functions (DCT-2, DST-4 and DST-7 for N-point input), according to an embodiment.

FIG. 5C shows a Generic LGT characterized by self-loop weights and edge weights, according to an example embodiment.

Figure 5D:
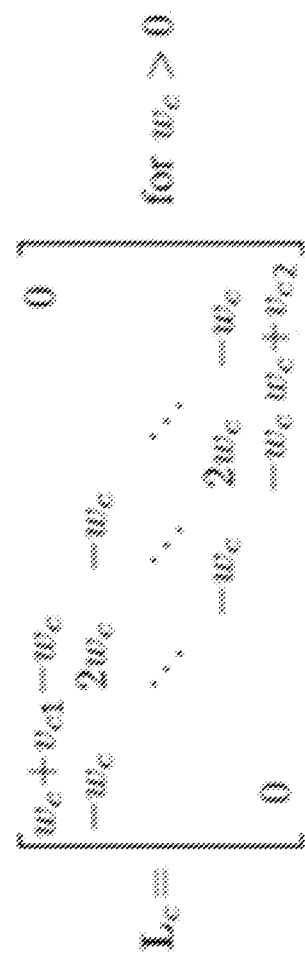

FIG. 5D shows a matrix Lc, according to an example embodiment.

Figure 6A:
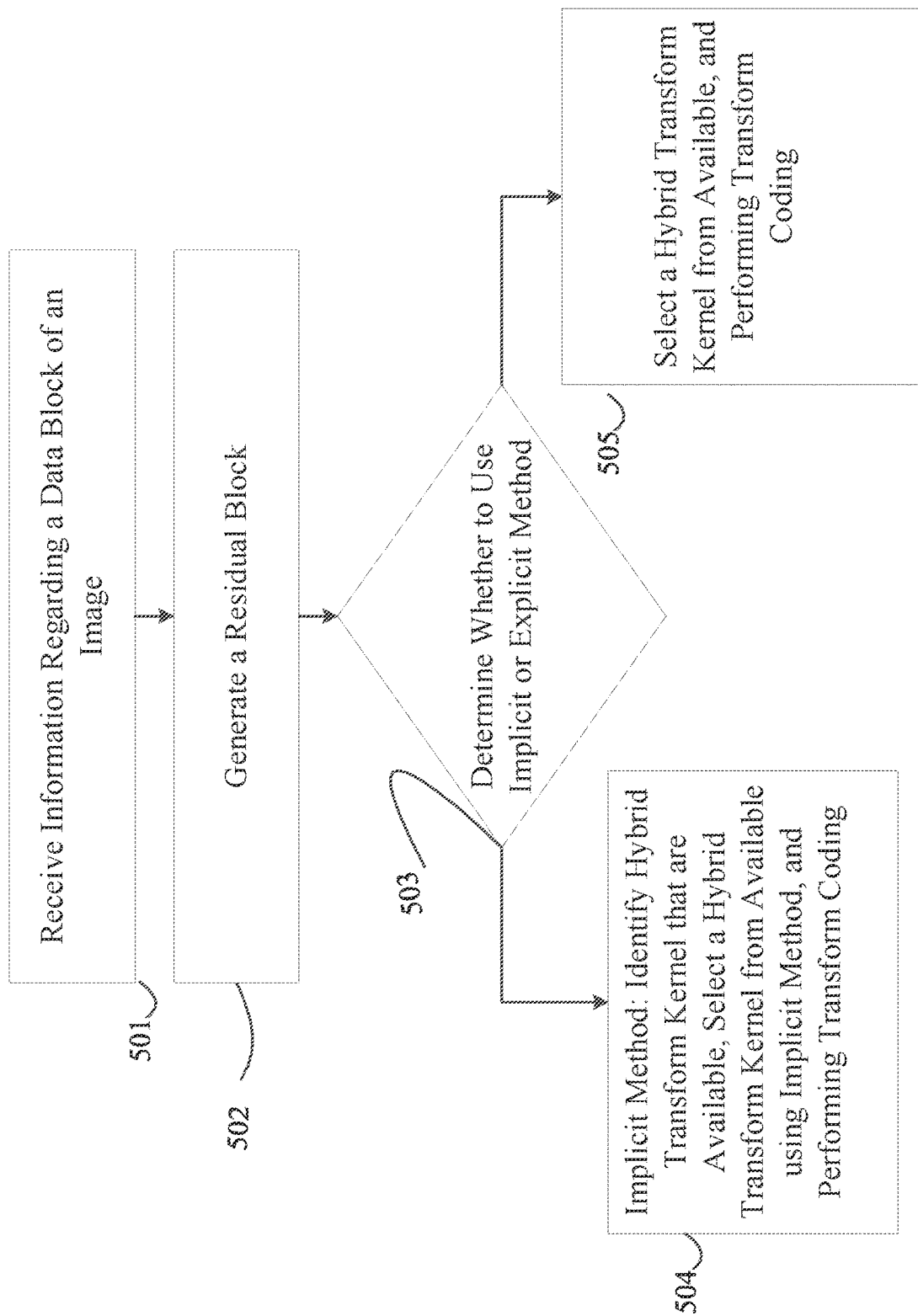

FIG. 6A is a schematic illustration of an exemplary method in accordance with an embodiment.

Figure 6B:
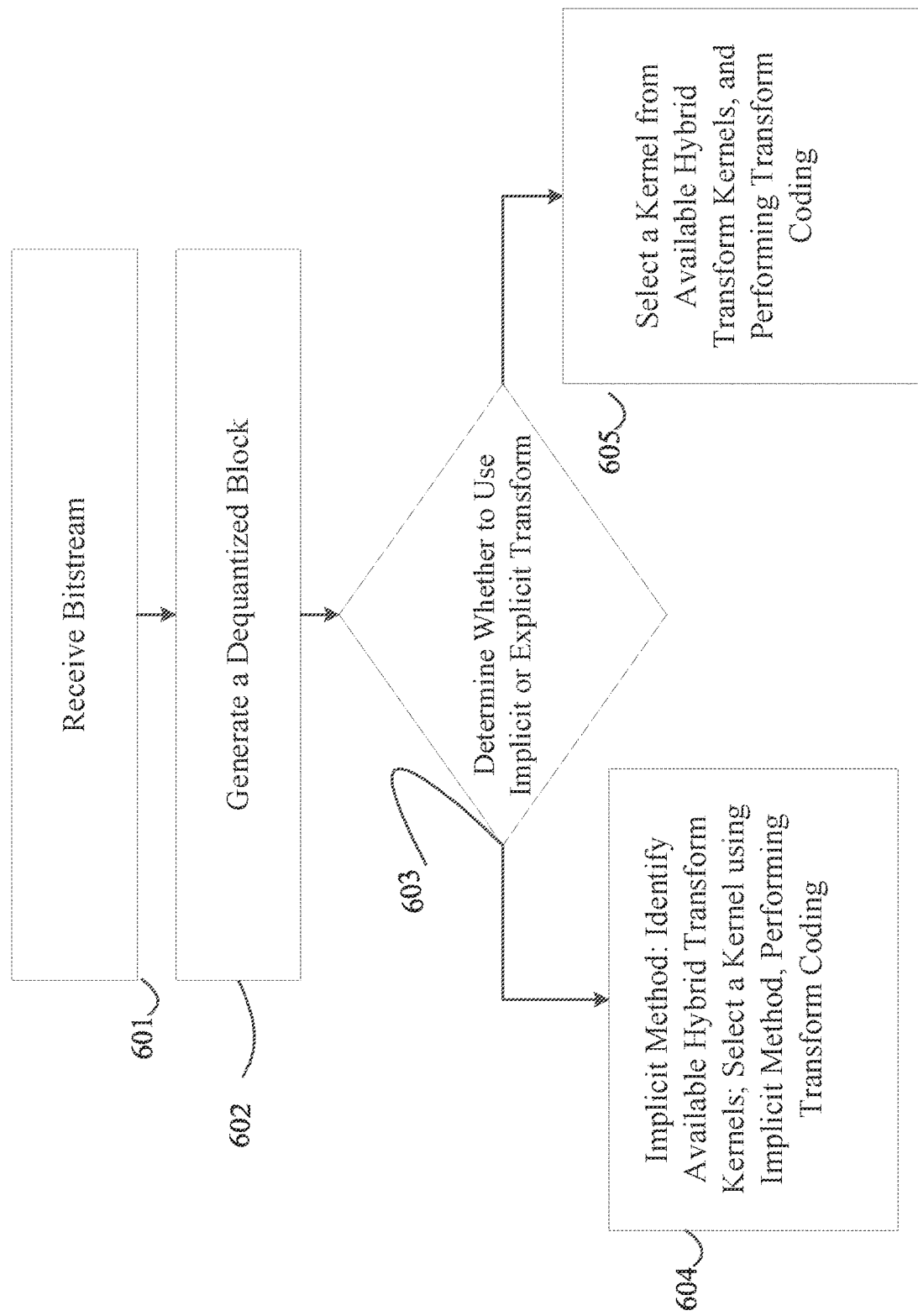

FIG. 6B is a schematic illustration of an exemplary method in accordance with an embodiment.

FIG. 7 is a schematic illustration of a computer system in accordance with an embodiment.

DETAILED DESCRIPTION

Figure 1:
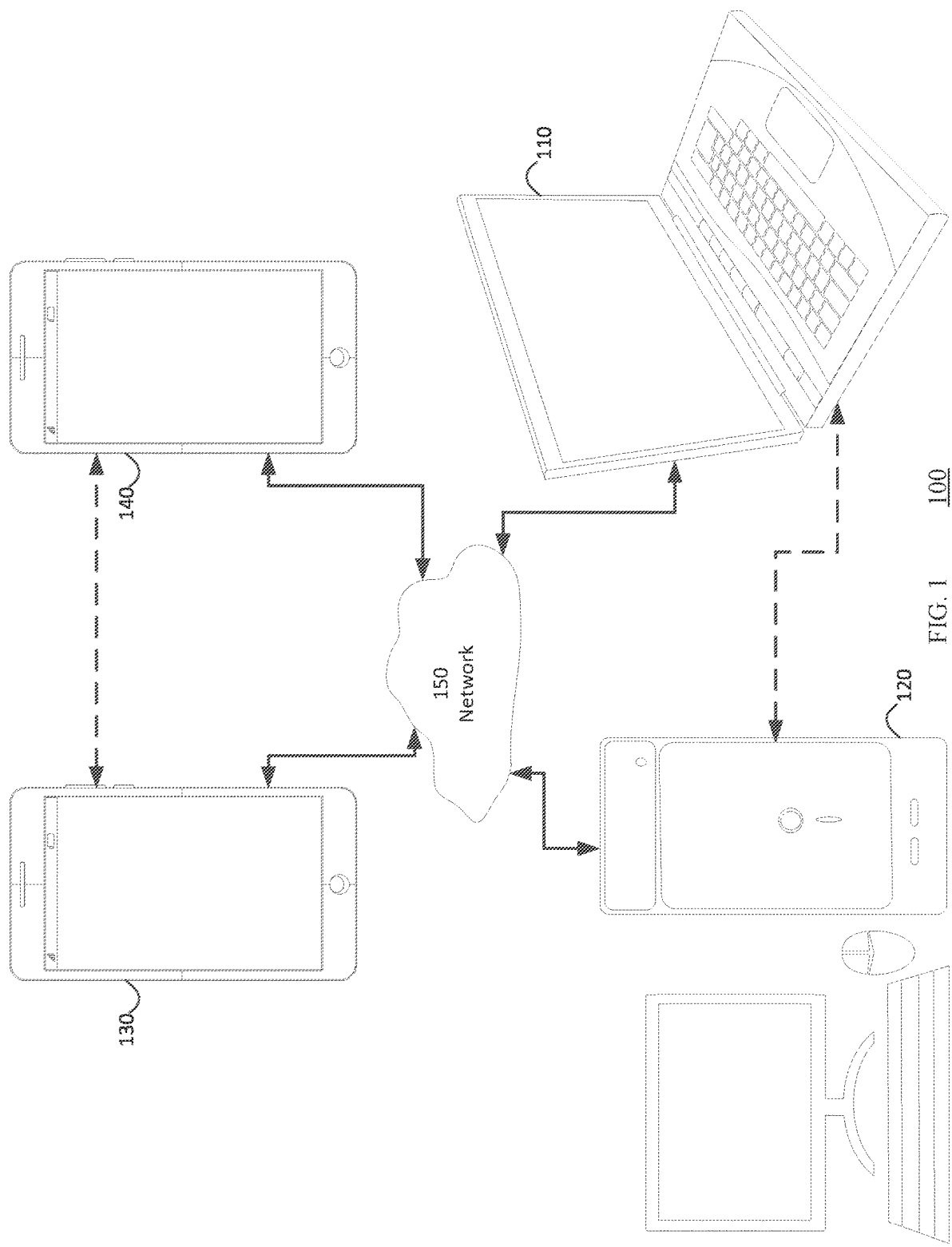
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110, 120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be illustrated as a laptop 110, a server 120, and smartphones 130 and 140, but the principles of the present disclosure are not so limited. Embodiments of the present disclosure find application with other equipment including but not limited to laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
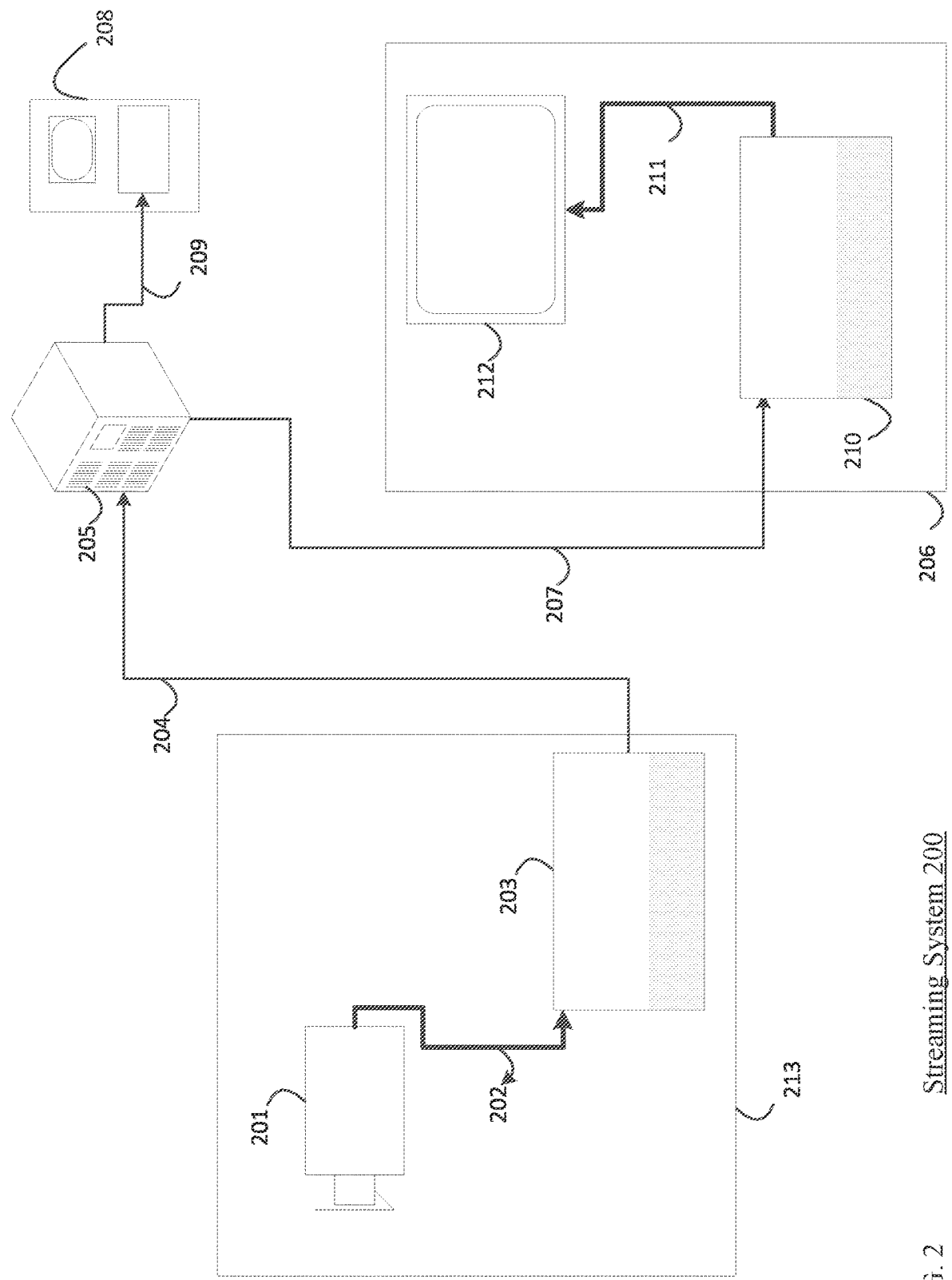
FIG. 2 is a schematic illustration of a simplified block diagram of a streaming system in accordance with an embodiment.

FIG. 2 illustrates, as an example for an application for the disclosed subject matter, the placement of a decoder 210 in a streaming environment/streaming system 200. Decoder 210 is further discussed with reference to FIG. 3 and the decoder 433 in FIG. 4. The decoder 210 may correspond to decoder 210 in FIG. 3 or the decoder 433 in FIG. 4.

The disclosed subject matter can be equally applicable to other video enabled applications, including, for example, video conferencing, digital TV, storing of compressed video on digital media including CD, DVD, memory stick and the like, and so on.

As shown in FIG. 2, a streaming system (200) may include a capture subsystem (213), which can include a video source (201), for example a digital camera, which may create an uncompressed video sample stream (202). That sample stream (202), depicted as a bold line to emphasize a high data volume when compared to encoded video bit streams, can be processed by a source encoder (203) coupled to the camera (201). The source encoder (203) can include hardware (e.g., a processor or circuit and memory), software, or a combination thereof to enable or implement aspects of the disclosed subject matter as described in more detail below. The encoded video bit stream (204), depicted as a thin line to emphasize the lower data volume when compared to the sample stream, can be stored on a streaming server (205) for future use. One or more streaming clients (206, 208) can access the streaming server (205) to retrieve copies (207, 209) of the encoded video bitstream (204). A client (206) can include a video decoder (210) which may decode the incoming copy of the encoded video bitstream (207) and may create an outgoing video sample stream (211) that can be rendered on a display (212) or other rendering device.

Figure 3:
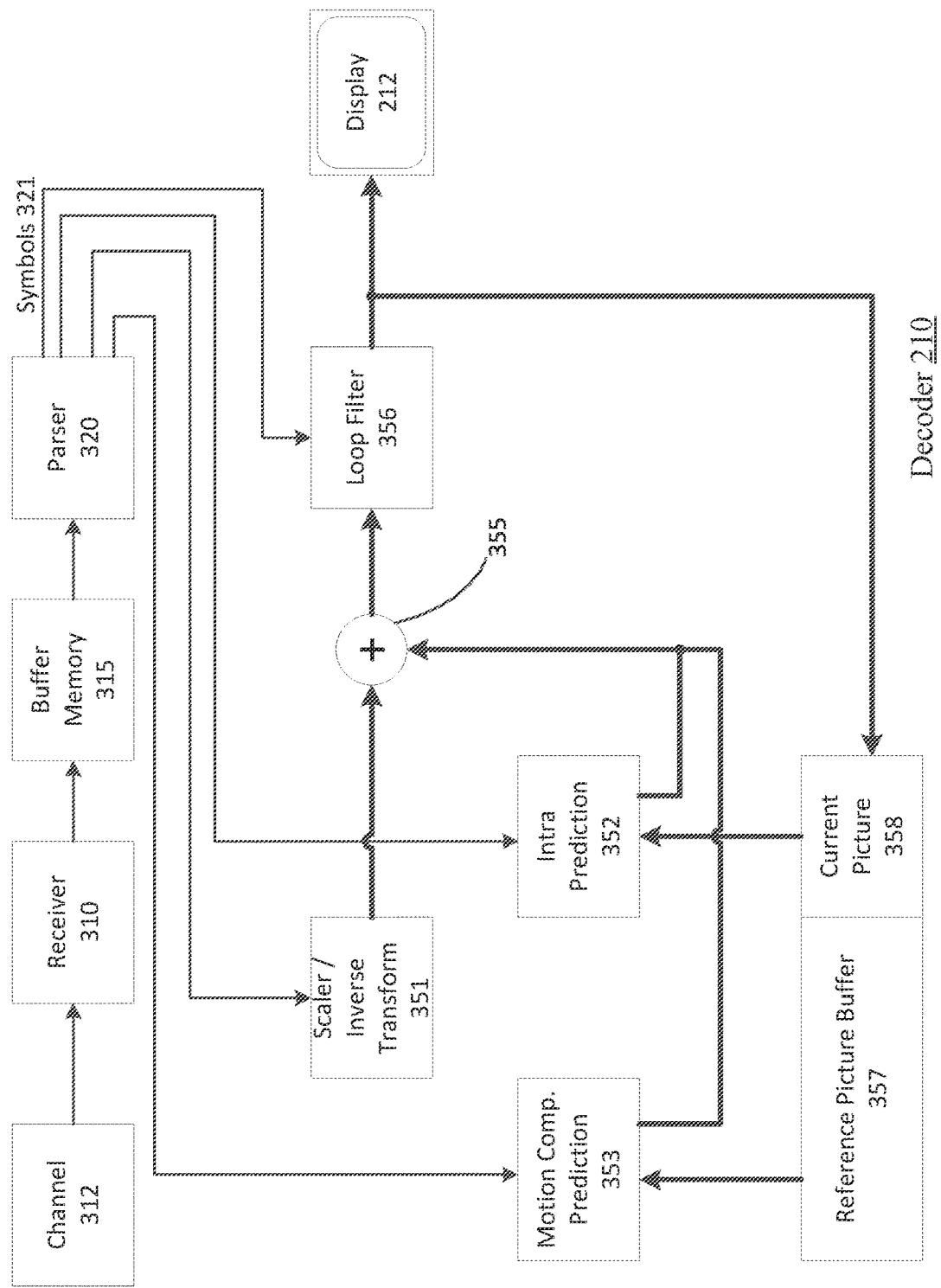
FIG. 3 is a schematic illustration of a simplified block diagram of a decoder in accordance with an embodiment.

FIG. 3 illustrates a functional block diagram of a decoder (210) (e.g., a video decoder) according to an embodiment of the present disclosure. As shown in FIG. 3, a receiver (310) may receive one or more codec video sequences to be decoded by the decoder (210). In the same or another embodiment, one coded video sequence may be received at a time, where the decoding of each coded video sequence is independent from other coded video sequences. The coded video sequence may be received from a channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, a buffer memory (315) may be coupled in between a receiver (310) and an entropy decoder/parser (320) ("parser" henceforth). When receiver (310) is receiving data from a store/forward device of sufficient bandwidth and controllability, or from an isosychronous network, the buffer (315) may not be needed, or can be small. For use on best effort packet networks such as the Internet, the buffer (315) may be required, which can be comparatively large and can advantageously be of adaptive size.

The video decoder (210) may include a parser (320) to reconstruct symbols (321) from the entropy coded video sequence. Categories of those symbols include information used to manage operation of the decoder (210), and potentially information to control a rendering device such as a display (212) that is not an integral part of the decoder but can be coupled to it, as shown in FIGS. 2 and 3. The control information for the rendering device(s) may be in the form of Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser 320 may also extract from the coded video sequence information such as transform coefficients, quantizer parameter values, motion vectors, and so forth.

The parser (320) may perform entropy decoding/parsing operation on the video sequence received from the buffer (315), so as to create symbols (321). Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit may be the scaler/inverse transform unit (351). The scaler/inverse transform unit (351) may receive a quantized transform coefficient as well as control information, including which transform to use, a block size, a quantization factor, quantization scaling matrices, etc. as symbol(s) (321) from the parser (320). It can output blocks comprising sample values that can be input into an aggregator (355).

In some cases, the output samples of the scaler/inverse transform (351) can pertain to an intra-coded block, which is a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter-coded block, and a potentially motion compensated block. In such a case, a Motion Compensation Prediction unit (353) can access reference a picture memory (357) to fetch samples used for prediction. After motion compensating the fetched samples in accordance with the symbols (321) pertaining to the block, these samples can be added by the aggregator (355) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (321) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (212) as well as stored in the reference picture memory (357) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture (358) can become part of the reference picture buffer (357), and a fresh current picture memory can be reallocated before commencing the reconstruction of the following coded picture.

The video decoder 210 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), and/or maximum reference picture size. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
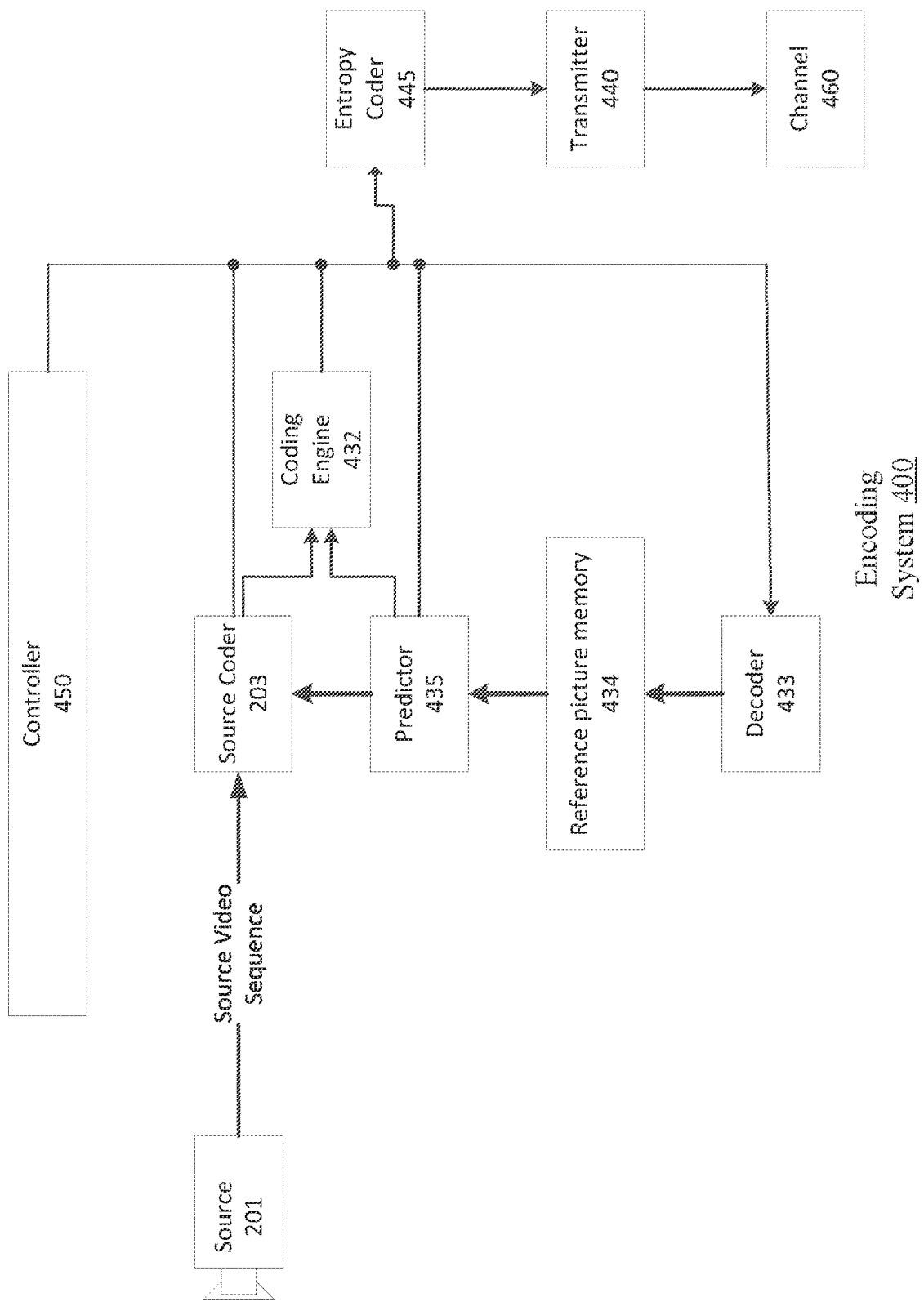
FIG. 4 is a schematic illustration of a simplified block diagram of an encoding system including an encoder and a local decoder in accordance with an embodiment.

FIG. 4 may be a functional block diagram of an encoding system (400) including a source coder (203), which may be a video encoder (203) according to an embodiment of the present disclosure.

The encoder (203) may receive video samples from a video source (201) (that is not a part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device, which may include a memory and processor, that stores previously prepared video. In a videoconferencing system, the video source (201) may include a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (203) may code and compress the pictures of the source video sequence into a coded video sequence in real time or under any other time constraints as required by the application. Enforcing appropriate coding speed is one function of controller (450). The controller 450 may control other functional units as described below and is functionally coupled to these units. The coupling is not depicted for clarity. Parameters set by the controller 450 can include rate control related parameters (e.g., picture skip, quantizer, lambda value of rate-distortion optimization techniques), a picture size, a group of pictures (GOP) layout, a maximum motion vector search range, and so forth. A person skilled in the art can readily identify other functions of controller (450) as they may pertain to video encoder (203) optimized for a certain system design.

Some video encoders operate in what a person skilled in the art readily recognizes as a "coding loop." As an oversimplified description, a coding loop can consist of the encoding part of a source encoder (430) ("source coder" or "source encoder" henceforth), which is responsible for creating symbols based on an input picture to be coded, and a reference picture(s), and a local decoder (433) embedded in the encoder (203) that reconstructs the symbols to create the sample data a remote decoder 210 also would create (as any compression between symbols and coded video bitstream is lossless in the video compression technologies considered in the disclosed subject matter). That reconstructed sample stream is input to the reference picture memory (434). As the decoding of a symbol stream leads to bit-exact results independent of a decoder location (local or remote), the reference picture buffer content is also bit exact between local encoder and remote encoder. In other words, the prediction part of an encoder "sees," as reference picture samples, exactly the same sample values as a decoder would "see" when using prediction during decoding. This fundamental principle of reference picture synchronicity (and resulting drift, if synchronicity cannot be maintained, for example, because of channel errors) is well known to a person skilled in the art.

The operation of the "local" decoder (433) can be the same as of a "remote" decoder (210), which has already been described in detail above in conjunction with FIG. 3. Briefly referring also to FIG. 3, however, as symbols are available and en/decoding of symbols to a coded video sequence by entropy coder (445) and parser (320) can be lossless, the entropy decoding parts of decoder (210) (including channel (312), receiver (310), buffer (315), and parser (320)) may not be fully implemented in local decoder (433).

An observation that can be made at this point is that any decoder technology except the parsing/entropy decoding that is present in a decoder also necessarily needs to be present, in substantially identical functional form, in a corresponding encoder. The description of encoder technologies are the inverse of the described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture cache (434). In this manner, the source encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450), which may include a processor, may manage coding operations of the source coder (203), including, for example, setting of parameters and subgroup parameters used for encoding the video data.

Output of all aforementioned functional units may be subjected to entropy coding in the entropy coder (445). The entropy coder may translate the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the source coder (203) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as one of the following frame types from among, for example, an Intra Picture (I picture), a Predictive picture (P picture) and a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive Picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference pictures. Blocks of B pictures may be coded predictively, via spatial prediction or via temporal prediction with reference to one or two previously coded reference pictures.

The source coder (203) may perform coding operations according to a predetermined video coding technology or standard, such as ITU-T Rec. H.265, or VVC. In its operation, the source coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

As discussed above, the coding of the coded video sequence can be in accordance with a video coding technology or standard, and can follow principles well known to a person skilled in the art, including variable length coding, Huffman coding, arithmetic coding with or without context sensitivity, and so forth. In some streaming systems, the video bitstreams (e.g., 204, 207, and 209) can be encoded according to certain video coding/compression standards. An example of those standards include ITU-T HEVC Recommendation of H.265.

AV1 Primary Transforms

In order to support the extended coding block partitions in AOMedia Video 1 (AV1), multiple transform sizes (ranging from 4-point to 64-point for each dimension) and transform shapes (square; rectangular with width/height ratio's 2:1/1:2, and 4:1/1:4) are introduced in AV1.

Transform Kernels

The two-dimensional (2D) transform process may involve the use of hybrid transform kernels (e.g., composed of different one-dimensional (1D) transforms for each dimension of the coded residual block). According to an embodiment, sizes of the primary 1D transforms may be: a) 4-point, 8-point, 16-point, 32-point, or 64-point DCT-2; b) 4-point, 8-point, or 16-point asymmetric DST's (DST-4, DST-7) and their flipped versions; c) 4-point, 8-point, 16-point, or 32-point identity transforms. The basis functions for the DCT-2 and asymmetric DST's used in AV1 are listed in Table 1, which is shown in FIG. 5A.

Table 1 in FIG. 5A Shows AV1 Primary Transform Basis Functions (DCT-2, DST-4 and DST-7 for N-Point Input).

TABLE 1

| Transform Type | Basis function $T_i(j)$, i, j = 0, 1, ..., N − 1 |
|---|---|
| DCT-2 | $T_i(j) = \omega_0 \cdot \sqrt{\frac{2}{N}} \cdot \cos\left(\frac{\pi \cdot i \cdot (2j+1)}{2N}\right)$ where $\omega_0 = \begin{cases} \sqrt{\frac{2}{N}} & i = 0 \\ 1 & i \neq 0 \end{cases}$ |
| DST-4 | $T_i(j) = \sqrt{\frac{2}{N}} \cdot \sin\left(\frac{\pi \cdot (2i+1) \cdot (2j+1)}{4N}\right)$ |
| DST-7 | $T_i(j) = \sqrt{\frac{4}{2N+1}} \cdot \sin\left(\frac{\pi \cdot (2i+1) \cdot (j+1)}{2N+1}\right)$ |

The availability of hybrid transform kernels may be based on the transform block size and prediction mode. This dependency is listed in Table 2, which is shown in FIG. 5B.

Table 2 (FIG. 5B) shows AV1 hybrid transform kernels and their availability based on prediction modes and block sizes. In Table 2, the symbols "→" and "↓" denote the horizontal and vertical dimensions, respectively, and the symbols "✓" and "x" denotes availability and unavailability, respectively, of a kernel for that block size & prediction mode.

An invertible 4×4 Walsh-Hadamard transform may also be employed for lossless coding, according to an embodiment.

Primary Transforms for AV2

In the AV2 development process, line graph transforms (LGT) have been introduced with the view of replacing and extending (by introducing 32-point, 64-point) the 1D DST's described above.

Graphs are generic mathematical structures consisting of sets of vertices and edges, which may be used for modelling affinity relations between the objects of interest. See, e.g., Non-Patent Literature 1. In practice, weighted graphs (for which a set of weights are assigned to edges and potentially to vertices) may provide sparse representations for robust modeling of signals/data. LGTs can improve coding efficiency by providing a better adaptation for diverse block statistics. In Non-Patent Literatures 2 and 3, separable LGTs are designed and optimized by learning line graphs from data to model underlying row and column-wise statistics of blocks residual signals, where the associated generalized graph Laplacian (GGL) matrices are used to derive LGTs.

For example, FIG. 5C shows a Generic LGT characterized by self-loop weights vc1, vc2 and edge weights wc.

According to an embodiment, as shown in FIG. 5D, given a weighted graph G (W, V) the GGL matrix may be defined as:

$$L_c = D - W + V \quad \text{(Eq. 1)}$$

where W is the adjacency matrix consisting of non-negative edge weights $w_c$, D is the diagonal degree matrix, and V is the diagonal matrix denoting weighted self-loops $v_{c1}$, $v_{c2}$. As shown in FIG. 5D, the matrix $L_c$ can be represented as:

$$L_c = \begin{bmatrix} w_c + v_{c1} & -w_c & & & 0 \\ -w_c & 2w_c & -w_c & & \\ & \ddots & \ddots & \ddots & \\ & & -w_c & 2w_c & -w_c \\ 0 & & & -w_c & w_c + v_{c2} \end{bmatrix} \text{ for } w_c > 0 \quad \text{(Eq. 2)}$$

The LGTs can then be derived by the eigen-decomposition of the GGL $L_c$.

$$L_c = U \Phi U^T \quad \text{(Eq. 3)}$$

where columns of orthogonal matrix U are the basis vectors of the LGT, and $\Phi$ is the diagonal eigenvalue matrix.

In fact, DCTs and DSTs, including DCT-2, DCT-8 and DST-7, may be LGTs derived from certain forms of GGLs, such as:

DCT-2 is derived by setting $v_{c1} = 0$
DST-7 is derived by setting $v_{c1} = w_c$
DCT-8 is derived by setting $v_{c2} = w_c$
DST-4 is derived by setting $v_{c1} = 2w_c$
DCT-4 is derived by setting $v_{c2} = 2w_c$ In AV2, the LGTs may be implemented as matrix multiplications. The 4 p (4-point) LGT core may be derived by setting $v_{c1} = 2w_c$ in $L_c$, which means that it is a DST-4. The 8 p (8-point) LGT core may be derived by setting $v_{c1} = 1.5w_c$ in $L_c$, the 16 p (16-point), 32 p (32-point), and 64 p (64-point) LGT cores may be derived by setting $v_{c1} = w_c$ in $L_c$, which means that it is a DST-7.

In AV1, the largest coding block unit may be referred to as a superblock. The superblock may be further divided into subblocks (coding blocks), such as, 10 different partitioning patterns using a partition-tree structure supporting the 10 different partitioning patterns (which may include a no split partition). Moreover, the coding blocks (or subblocks) can be further partitioned into multiple subblocks, such as, subblocks with a partitioning depth up to 2 levels (or more).

In AV1, a set of hybrid transform kernels for transform coding the blocks composed of residual signals after intra or inter prediction may be used.

In an embodiment, the availability of the hybrid kernels depends on the prediction mode and the size of the residual block as listed in Table 2 (See FIG. 5B).

However, with the introduction of LGT's (and their flipped versions) of larger sizes (16 p, 32 p, or 64 p) in the AV2 development process, the set of available hybrid transform kernels has expanded. Thus, according to an embodiment, a computerized method may efficiently utilize the expanded set of hybrid kernels without incurring additional computational complexity (e.g., complexity associated with selecting from the expanded kernels). For example, to select a particular kernel may include selecting a kernel from the plurality of options in Table 2 (FIG. 5B) by using an association table. For example, Table 2, which is a subset map, could be used as an association table and a priority order set in advance could be used for selection. For example, a brute force method could be used. In the specification, a block size may refer to one or more of: a block width, block height, a block aspect ratio, a block area size, a maximum between block width and height, a minimum between block width and height, or a block width and height when they are equal (square). The extended set of hybrid transform kernels will henceforth be referred to as a set A. Set A exhaustively includes all combinations of DCT, IDTX, ADST, FLIPADST, LGT, FLIPLGT, KLT. A subset of elements of A, which is a reduced set of transform types, will henceforth be referred to as x; such that x∈A. The subset x may include one or more transform types, e.g., {DCT, ADST, LGT, KLT}, and/or the subset x may include one or more combinations of vertical and horizontal transform types, e.g., {DCT_DCT, LGT_LGT, DCT_LGT, LGT_DCT}. For example, once a new transform is introduced (e.g., KLT, LGT), the kernel set is explained. Set A may correspond to a combination of all transform types that will be used and subset x means less than all or could mean of Set A. In an embodiment, a choice is made from subset x, such as, based on a size of the block.

In the specification, superblock may refer to the largest (biggest) coding block.

According to various embodiments two different methods may be used to switch between the elements of x, when applying a transform at block-level. Block-level may refer to, but not limited to, superblock level, coding block level, prediction block level or transform block level. The superblock may be the biggest available, and the smallest block may be a transform block (e.g., 4×4, or 128×128 or 256×256).

The two different types of methods may include an explicit method and an implicit method.

Explicit Switching Method

According to an embodiment, an explicit method for switching between elements of x, or switching different x, may be provided An explicit method may mean that the switching needs to be identified by a syntax signaled in a bitstreams, e.g., the encoder needs to explicitly chose and signal the transform type for each block and the decoder needs to parse the bitstream to determine the transform type for each block. For example, in the explicit method, a selection of a subset of hybrid transform kernels may include signaling in the bitstream (e.g., binary bitstream) what element you are choosing. The signal may be a binary bistream signal, a flag or a binary combination that indicates.

According to an embodiment, there may be a default toggle (if not default, then actual transform used. According to an embodiment, a flag Y may be an indicator flag. There could also be a two part flag for LGT, where higher level transform type or default. For example, if "1" for first flag, can choose anyone from using the second flag (need another flag lower level).

In one embodiment, the switch may occur at sequence-level, frame-level or tile-level and the switch is indicated by a flag X signaled into the bitstream. The flag may be also signalled in a high-level syntax element, including, but not limited to VPS, SPS, PPS, Slice header.

In one embodiment, the switch may occur at block-level, and the switch is indicated by a flag X signaled into the bitstream.

In one embodiment, the flag X with value 0 indicate that only a default transform type is available for coding the blocks in the sequence, frame, tile or block in both vertical and horizontal dimensions. Examples of the default transform type include, but not limited to discrete cosine transform (DCT), asymmetric discrete sine transform (ADST), line graph transform (LGT), or Karhunen-Loève transform (KLT).

In one embodiment, the flag X with value 1 indicate the availability of x for coding the sequence, frame, tile or block in both vertical and horizontal dimensions.

In one embodiment, another flag Y is introduced at the block-level to indicate the element of x used in transform coding that block.

In one embodiment, when the selected hybrid transform candidate involves the use of LGT, identifiers of the self-loop weights (vc1, vc2) that specify the LGT candidate can be signalled in the bitstream at block-level, the identifier can be either an index of the associated self-loop rate value or the self-loop rate values. For example, a flag Y may be a unique value or a unique identifier.

In one embodiment, when the selected hybrid transform candidate involves the use of KLT, identifiers of the KLT kernel can be signalled in the bitstream at block-level, the identifier can be either an index of the KLT or the KLT matrix element values.

In one embodiment, elements of x may include one or more transform types, e.g., {DCT, ADST, LGT, KLT}, and/or one or more combinations of vertical and horizontal transform types, e.g., {DCT_DCT, LGT_LGT, DCT_LGT, LGT_DCT}.

Implicit Switching Method

According to an embodiment, an implicit switching method may switch between elements of x. According to an embodiment, the implicit switching method selects a transform type based on coded information that is available to both an encoder and decoder, therefore, no additional signaling is needed to specify the transform type, such as, at the decoder. For example, no flags are needed like in the explicit switching method. The coded information may include a block size.

In one embodiment, the available elements of x depend on the prediction process used to obtain the residual block. For example, intra predicted and inter predicted blocks may choose different elements of x.

In one embodiment, the available element of x depend on the intra prediction mode used to obtain the residual block. The intra prediction process involves multiple directional, non-directional, recursive filtering and chroma from luma modes. Each of the different modes can choose an element of x.

In one embodiment, for blocks larger than M×N in block size, only a default transform type may be available for coding the blocks in the sequence, frame, tile or block in both vertical and horizontal dimensions. Examples of the default transform type include, but are not limited to DCT, ADST or LGT or KLT. For example, if a block size (M×N) is greater than a block size threshold (e.g., 32×32), DCT (a hybrid kernel) may be used. Additional information is not needed to be signaled because it is possible to know a transform type based on a block size. As another example, a decision may be made based on if the block size is smaller than a second threshold.

For example, if rectangular or square different transform types, could make a decision on which side is smaller. For example, if 16×32, the shorter size side may use LGT, and a longer side may use DCT. According to an embodiment, LGT may be used in general for any rectangular or square block. In one embodiment, for blocks smaller than M×N in block size, only one element of x is available for coding the blocks in the sequence, frame, tile or block in both vertical and horizontal dimensions. Examples of the available element of x may include one among the transform types, e.g., {DCT, ADST, LGT, KLT}, and/or one among the combinations of vertical and horizontal transform types, e.g., {DCT_DCT, LGT_LGT, DCT_LGT, LGT_DCT}.

In one embodiment, the available element of x depends on the shape of the M×N block.

In one embodiment, for square blocks, only an element of x is available, e.g., including but not limited to LGT_LGT.

In one embodiment, for rectangular blocks, only an element of x is available, e.g., including but not limited to DCT_LGT.

In one embodiment, for rectangular blocks, only an element of x is available for the shorter of the vertical and horizontal dimensions, e.g., including but not limited to LGT, ADST, FLIPADST, FLIPLGT.

In one embodiment, for rectangular blocks, only an element of x is available for the longer of the vertical and horizontal dimensions, e.g., including but not limited to DCT.

The switch between an explicit method (above bullet #1) and an implicit method (above bullet #2) can be indicated at either HLS or a block-level.

When the switch is indicated at HLS, it may include, VPS, SPS, PPS, Slice header.

When the switch is indicated at block level, it may include superblock level, coding block level, prediction block level or transform block level.

For one block size, different transform kernels can be used between the implicit methods and explicit method.

In one embodiment, for a certain block size, the LGT used in implicit transform and explicit transform apply different self-loop rates. Examples of the block size include but are not limited to: 4×4, 4×8, 8×4, 8×8, 4×16, 16×4, 8×16, 16×8, 16×16. According to an embodiment, switching on a block level may be performed. The block may be divide the frame in video into multiple blocks. According to an embodiment, a decision to switch could be done at a block level or at a higher up level.

According to a method, a notification of where the switch happens may be performed.

According to the implicit method, we can reduce computational complexity, which can increase performance. This can be applied on a frame or a sub-block. A block can be a sub-block or superblock.

A data block may refer to after prediction, such as residue from a predictor block.

Referring to FIG. 6A, in a first, simple example, according to an aspect of the disclosure, a method may comprise: receiving information regarding a data block of an image (Operation 501).

The method may further comprise: performing control so that a residual block composed of residual signals after intra or inter prediction is generated (Operation 502).

The method may further comprise determining whether to use Implicit or Explicit Method (Operation 503).

The method may further comprise: identifying one or more hybrid transform kernel that are available for encoding the residual block based on associations between prediction modes and sizes of residual blocks. The method may comprise: identifying one or more hybrid transform kernel that are available for encoding the residual block based on associations between prediction modes and sizes of residual blocks, and selecting a hybrid transform kernel from among the one or more hybrid transform kernel that are available for encoding the residual block, and performing transform coding of the residual block using the selected hybrid transform kernel (Operation 504).

According to an embodiment, an explicit method may be used to select a hybrid transform kernel (Operation 505).

The at least two hybrid transform types may all be the same type(s), all be different type(s), or be a combination of some having the same type and some being different types. That is, there is no requirement regarding the at least two transform types being different types, and in some embodiments they are, but in some they are not.

The identifying of the subset of the hybrid transform kernels that are available for encoding the residual block may be based on an implicit method that includes selecting a transform type based on coded information that is available to both an encoder and a decoder.

The implicit method may include when a block size (M×N) is greater than a block size threshold, a first hybrid transform kernel may be used, and when the block size (M×N) is less than the block size threshold, a second hybrid transform kernel may be used, wherein the first hybrid transform kernel and the second hybrid transform kernel have at least one difference.

The implicit method may include identifying available elements of the subset based on a shape of the residual block.

The implicit method may include identifying available elements of the subset based on a shape of the residual block.

The at least one transform kernel may include one or more combinations of vertical and horizontal transform types.

The one or more combinations of vertical and horizontal transform types may include at least one line graph transform (LGT) core that performs direct matrix multiplications for one or more of the horizontal and vertical dimensions of the residual block.

The one or more combinations of vertical and horizontal transform types may include at least one of: DCT_DCT, LGT_LGT, DCT_LGT, or LGT_DCT, wherein LGT is a line graph transform (LGT) core that performs direct matrix multiplications for one or more of the horizontal and vertical dimensions of the residual block.

The performing of the transform coding of the residual block using the selected hybrid transform kernel may include performing, in no particular order: transform coding of a vertical dimension using a vertical transform type of the selected hybrid transform kernel; and transform coding of a horizontal dimension using a horizontal transform type of the selected hybrid transform kernel.

The hybrid transform kernels may be AOMedia Video 2 (AV2) hybrid transform kernels.

The identifying of the subset of the hybrid transform kernels that are available for encoding the residual block may be based on an explicit method, which includes a transform type being identified by a syntax or flag signaled in a bitstream.

The method may further comprise switching from the implicit method to an explicit method, which includes a transform type being identified by a syntax or flag signaled in a bitstream.

Different hybrid transform kernels may be used between the implicit method and the explicit method.

The syntax or flag may be indicated at a subblock-level including one or more of: superblock level, coding block level, prediction block level or transform block level.

According to an embodiment, a non-transitory computer-readable storage medium storing instructions that, when executed, cause a system or device comprising one or more processors to perform a method comprising: receiving information regarding a data block of an image; performing control so that a residual block composed of residual signals after intra or inter prediction is generated; identifying one or more hybrid transform kernel that are available for encoding the residual block based on associations between prediction modes and sizes of residual blocks, wherein each of the one or more hybrid transform kernel includes at least two transform types, which includes at least two transform types that are the same, or at least two transform types that are different; selecting a hybrid transform kernel from among the one or more hybrid transform kernel that are available for encoding the residual block; and performing transform coding of the residual block using the selected hybrid transform kernel.

According to an embodiment, an apparatus may comprise: at least one memory configured to store computer program code; and at least one processor configured to access the at least one memory and operate according to the computer program code, the computer program code comprising: receiving code configured to cause the at least one processor to receive information regarding a data block of an image; residual block generation code configured to cause the at least one processor to perform control so that a residual block composed of residual signals after intra or inter prediction is generated; identifying code configured to cause the at least one processor to identify one or more hybrid transform kernel that are available for encoding the residual block based on associations between prediction modes and sizes of residual blocks, wherein each of the one or more hybrid transform kernel includes at least two transform types, which includes at least two transform types that are the same, or at least two transform types that are different; selecting code configured to cause the at least one processor to selecting a hybrid transform kernel from among the one or more hybrid transform kernel that are available for encoding the residual block; and transform coding code configured to cause the at least one processor to perform transform coding of the residual block using the selected hybrid transform kernel.

According to an embodiment, a method of decoding image data performed by at least one processor may comprise: receiving information regarding a transform coded residual data block; identifying hybrid transform kernels that are available for decoding based on associations between prediction modes and sizes of residual blocks; selecting a hybrid transform kernel from among the hybrid transform kernels that are available for decoding; and performing decoding of the transform coded residual block using inverse of transforms in the hybrid transform kernel.

The method may further comprise: generating a displayable image based at least in part on the decoded residual block; and performing control so that the displayable image is displayed by a display.

The identifying of the subset of the hybrid transform kernels that are available for decoding may be based on an implicit method that includes selecting a transform type based on coded information that is available to both an encoder and a decoder.

The implicit method may include identifying the subset of the hybrid transform kernels that are available for decoding when a block is intra predicted, depending on the intra prediction mode.

The implicit method may include identifying the subset of the hybrid transform kernels that are available for decoding when a block is inter predicted.

The implicit method may include when a block size (M×N) is greater than a block size threshold, a first hybrid transform kernel is used, and when the block size (M×N) is less than the block size threshold, a second hybrid transform kernel is used, wherein the first hybrid transform kernel and the second hybrid transform kernel have at least one difference According to an embodiment, a method of encoding image data performed by at least one processor may comprise: receiving information regarding a data block of an image; performing control so that a residual block is generated, the residual block being composed of residual signals after intra or inter prediction; identifying a subset of available hybrid transform kernels, from among a set of hybrid transform kernels, based on whether intra prediction or inter prediction was performed and based on at least one of a height or a width of the residual block; selecting a hybrid transform kernel from the identified subset of available hybrid transform kernels; and performing transform coding of the residual block using the hybrid transform kernel.

Referring to FIG. 6B, as an example, according to an aspect of the disclosure, a method, such as a method of decoding using implicit/explicit method, may comprise: receiving a bistream (Operation 601). A bitstream may refer to an encoded video or image received by the decoder (receiving a bitstream at the decoder).

The method may further comprise: generating a dequantized block (Operation 602). Generating a dequantized block may further comprise (including but not limited to): parsing the bitstream, decoding the entropy coded bitstream, a dequantization process to generate a dequantized block.

The method may further comprise determining whether to use Implicit or Explicit Method (Operation 603).

The method may further comprise: identifying one or more hybrid transform kernel that are available for decoding the block based on associations between prediction modes and sizes of blocks. The method may comprise: identifying one or more hybrid transform kernel that are available for decoding the block based on associations between prediction modes and sizes of blocks, and selecting a hybrid transform kernel from among the one or more hybrid transform kernel that are available for decoding the block, and performing transform coding of the block using the selected hybrid transform kernel (Operation 604).

According to an embodiment, an explicit method may be used to select a hybrid transform kernel (Operation 605).

The techniques for encoding/decoding can be implemented by one or more processors that may execute computer software having computer-readable instructions that may be physically stored in one or more computer-readable media (e.g., a hard disk drive). For example, FIG. 7 shows a computer system 700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 10 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, data-glove 704, joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data-glove 704, or joystick 705, but there can also be tactile feedback devices that do not serve as input devices), audio output devices (such as: speakers 709, headphones (not depicted)), visual output devices (such as screens 710 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" or "computer readable medium" as used in connection with the presently disclosed subject matter does not encompass transmission media, carrier waves, or other transitory signals.

Computer system 700 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system 700; others are commonly integrated into the core of the computer system 700 by attachment to a system bus as described below (for example Ethernet interface into a PC computer system or cellular network interface into a smartphone computer system). Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators for certain tasks 744, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include PCI, USB, and the like.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software.

In addition or as an alternative, the computer system 700 may provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method of decoding image data performed by at least one processor, the method comprising:
   receiving a coded bitstream that includes an image;
   generating a dequantized block of the image based on the coded bitstream;
   determining whether to use one from among an implicit method and an explicit method for selecting a hybrid transform kernel from among one or more hybrid transform kernel that are available for decoding the dequantized block, wherein the one or more hybrid transform kernel are available for decoding the dequantized block based on associations between prediction modes and sizes of blocks, and each of the one or more hybrid transform kernel includes at least two transform types, which includes at least two transform types that are the same, or at least two transform types that are different;
   selecting, by using the one from among the implicit method and the explicit method, the hybrid transform kernel from among the one or more hybrid transform kernel that are available for decoding the dequantized block; and
   performing inverse transform coding of the dequantized block based on the selected hybrid transform kernel,
   wherein the explicit method is determined to be used,
   the one or more hybrid transform kernel includes one or more combinations of vertical and horizontal transform types,
   the method further comprises obtaining a first flag and a second flag from the coded bitstream that identify the hybrid transform kernel, as a part of the explicit method, and
   the first flag indicates availability of the one or more hybrid transform kernel for decoding, and the second flag indicates the hybrid transform kernel, that includes a combination of a vertical and a horizontal transform type, from among the one or more hybrid transform kernel used for decoding.

2. The method of claim 1, wherein the one or more combinations of vertical and horizontal transform types includes at least one line graph transform (LGT) core that performs direct matrix multiplications for one or more of the horizontal and vertical dimensions of the dequantized block.

3. The method of claim 1, wherein the one or more combinations of vertical and horizontal transform types includes at least one of: DCT_DCT, LGT_LGT, DCT_LGT, or LGT_DCT, wherein LGT is a line graph transform (LGT) core.

4. The method of claim 1, wherein the performing of the inverse transform coding of the dequantized block using the selected hybrid transform kernel includes performing, in no particular order:
   inverse transform coding of a vertical dimension using the vertical transform type of the selected hybrid transform kernel; and
   inverse transform coding of a horizontal dimension using the horizontal transform type of the selected hybrid transform kernel.

5. The method of claim 1, wherein the hybrid transform kernels are AOMedia Video 2 (AV2) hybrid transform kernels.

6. The method of claim 1, further comprising indicating a switch from the implicit method to the explicit method, wherein the explicit method includes a transform type being identified by a syntax or flag signaled in the coded bitstream.

7. The method of claim 6, wherein different hybrid transform kernels are used between the implicit method and the explicit method.

8. The method of claim 6, wherein the second flag is indicated at a subblock-level including one or more of: superblock level, coding block level, prediction block level or transform block level.

9. The method of claim 1, wherein the hybrid transform kernel that is selected includes a line graph transform (LGT), and
   the method further comprises signaling, as a part of the explicit method, an indicator of a self-loop weight value of the LGT.

10. An apparatus comprising:
    at least one memory configured to store computer program code; and
    at least one processor configured to access the at least one memory and operate according to the computer program code, the computer program code comprising:
    dequantized block generation code configured to cause the at least one processor to perform control so that a dequantized block of an image, received in a coded bitstream, is generated;
    determining code configured to cause the at least one processor to determine whether to use one from among an implicit method and an explicit method for selecting a hybrid transform kernel from among one or more hybrid transform kernel that are available for decoding the dequantized block, wherein the one or more hybrid transform kernel are available for decoding the dequantized block based on associations between prediction modes and sizes of blocks, and each of the one or more hybrid transform kernel includes at least two transform types, which includes at least two transform types that are the same, or at least two transform types that are different;
    selecting code configured to cause the at least one processor to select, by using the one from among the implicit method and the explicit method, the hybrid transform kernel from among the one or more hybrid transform kernel that are available for decoding the dequantized block; and transform coding code configured to cause the at least one processor to perform inverse transform coding of the dequantized block based on the selected hybrid transform kernel, wherein the one or more hybrid transform kernel includes one or more combinations of vertical and horizontal transform types, the computer program code further comprises obtaining code configured to cause the at least one processor to obtain a first flag and a second flag from the coded bitstream that identify the hybrid transform kernel, as a part of the explicit method, and the first flag indicates availability of the one or more hybrid transform kernel for decoding, and the second flag indicates the hybrid transform kernel, that includes a combination of a vertical and a horizontal transform type, from among the one or more hybrid transform kernel used for decoding.

11. A non-transitory computer-readable medium storing computer code that is configured to, when executed by at least one processor, cause the at least one processor to implement a decoder that:

receives a coded bitstream that includes an image;

generates a dequantized block of the image based on the coded bitstream;

determines whether to use one from among an implicit method and an explicit method for selecting a hybrid transform kernel from among one or more hybrid transform kernel that are available for decoding the dequantized block, wherein the one or more hybrid transform kernel are available for decoding the dequantized block based on associations between prediction modes and sizes of blocks, and each of the one or more hybrid transform kernel includes at least two transform types, which includes at least two transform types that are the same, or at least two transform types that are different;

selects, by using the one from among the implicit method and the explicit method, the hybrid transform kernel from among the one or more hybrid transform kernel that are available for decoding the dequantized block; and performs inverse transform coding of the dequantized block based on the selected hybrid transform kernel, wherein the one or more hybrid transform kernel includes one or more combinations of vertical and horizontal transform types, the computer code is configured to, when executed by the at least one processor, cause the at least one processor to obtain a first flag and a second flag from the coded bitstream that identify the hybrid transform kernel, as a part of the explicit method, and the first flag indicates availability of the one or more hybrid transform kernel for decoding, and the second flag indicates the hybrid transform kernel, that includes a combination of a vertical and a horizontal transform type, from among the one or more hybrid transform kernel used for decoding.

12. The non-transitory computer-readable medium of claim 11, wherein hybrid transform kernel that is selected includes a line graph transform (LGT), and the computer code is further configured to, when executed by the at least one processor, cause the at least one processor to, as a part of the explicit method, signal an indicator of a self-loop weight value of the LGT.

* * * * *